Oct. 20, 1942.  A. F. KAPTULLER  2,299,093
SPRING WASHER MEANS FOR FOOD CHOPPERS
Filed May 19, 1941
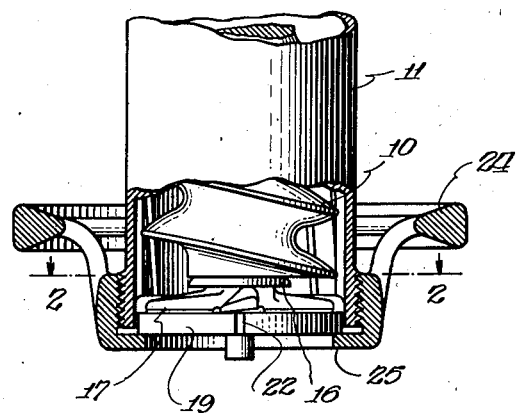
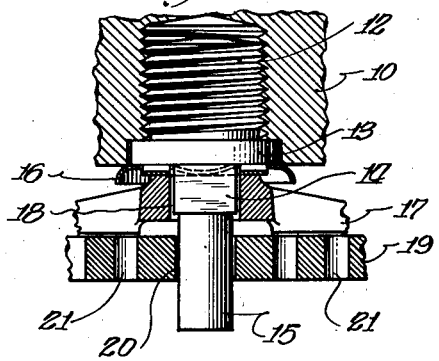
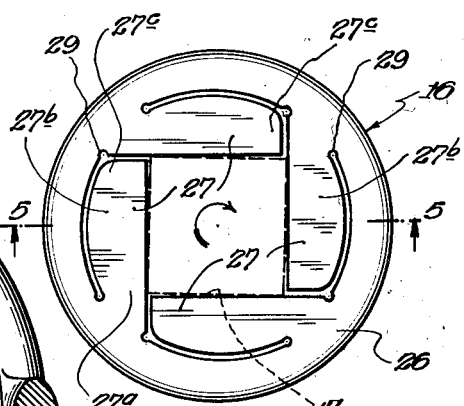
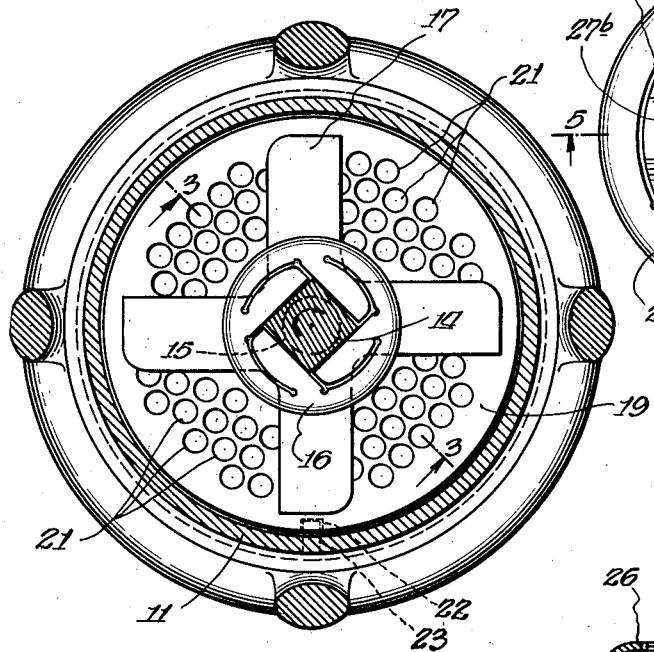
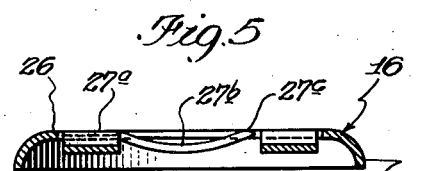
Inventor:
Alexander F. Kaptuller
By: Leslie W. Fricke
Attorney.

Patented Oct. 20, 1942

2,299,093

UNITED STATES PATENT OFFICE 2,299,093

SPRING WASHER MEANS FOR FOOD CHOPPERS

Alexander F. Kaptuller, Chicago, Ill.

Application May 19, 1941, Serial No. 394,045

7 Claims. (Cl. 146—189)

My invention relates to machines for grinding or chopping food materials, such as meat, and of the type comprising a screw for feeding the material, a perforated plate member at the discharge end of the screw and a knife member in working contact with one face of the plate member, one of the members rotating with the screw while the other member remains stationary.

It is an object of my invention to provide improved spring means for use in a machine of this type for urging the perforated discharge plate member and the knife member together with spring pressure whereby the wear and frictional resistance between the members will be maintained at a minimum.

It is a further object of my invention to provide spring means of such form that it will not collect food materials as they are fed through the grinder; also to provide spring means of such form that no recess in any of the parts of the grinder, and particularly in the feed screw thereof, will be required to house the spring means, any such recess being highly objectionable because food materials will collect in it when they are fed through the grinder.

It is another object of my invention to provide spring means of such construction that it requires very little space and may be installed in any standard grinder of the type mentioned, it being contemplated that my spring means shall be in the form of a washer and shall be positioned on the stub shaft carried by the feed screw and that no changes in the structure of the standard grinder need be made.

The preferred means by which I have accomplished my several objects are illustrated in the drawing and are hereinafter specifically described. That which I believe to be new and desire to cover by Letters Patent is set forth in the claims.

In the drawing,

Fig. 1 is a view partly sectional and partly in elevation of a portion of a food grinder equipped with my improved spring washer means;

Fig. 2 is a sectional view on an enlarged scale taken on line 2—2 of Fig. 1;

Fig. 3 is a sectional view taken on line 3—3 of Fig. 2;

Fig. 4 is a plan view on a still further enlarged scale of my improved spring washer means; and Fig. 5 is a sectional view taken on line 5—5 of Fig. 4.

Like characters of reference designate like parts in the several views.

Referring now to the drawing, the illustrated food grinder or chopper comprises a feed screw 10 surrounded by a housing 11. A shank or shaft 12, comprising a shoulder portion 13, a portion 14 which is square in cross section, and a cylindrical end portion 15, is fixed to the screw 10 at its lower end in any suitable manner as by threading with the shoulder portion 13 countersunk in the screw. A spring washer 16 is positioned on the square shank portion 14. A plural-bladed knife 17 having a square central opening 18 is non-rotatably positioned on the square shank portion 14. The opening 18 in the knife hub is slightly larger than the shank portion 14, so that the knife may be easily slipped off the shank for cleaning. A plate 19 having a cylindrical central opening 20 and a plurality of smaller holes or perforations 21 disposed about the central opening is positioned with the cylindrical shank portion 15 extending through the opening 20. The perforated plate 19 is provided with a slot 22 in its edge, and a pin 23 provided in the housing 11 extends into the slot and holds the plate 19 from rotating with respect to the member 11.

The housing 11 is externally threaded on its lower end as shown. A hand wheel 24 which is internally threaded is screwed on the housing 11. The hand wheel is provided with an inwardly extending flange 25 which makes contact with the plate 19 at its bottom edge and holds the plate in position on the shank portion 15.

My improved spring washer means 16, as illustrated, (see Figs. 4 and 5) comprises a flat ring portion 26 and four spring leaves 27 formed integrally therewith as chords. Each of the leaves has a straight inner side edge and these inner edges of the leaves define the central opening of the washer which is square. The square central opening of the washer is slightly larger in size than the square shank portion 14 which is shown in dotted lines in Fig. 4 and in cross section in Fig. 2. Each of the leaves comprises a base portion 27a, a central portion 27b and a free end or tip portion 27c. As shown in Fig. 5, the end portions 27a and 27c of each leaf are in the plane of the flat ring portion 26, and the central leaf portion 27b is out of the plane of the ring portion. In the embodiment of the spring washer shown, each leaf 27 is curved or bowed substantially uniformly from its base to its free end. The central opening of the washer, although shown as square, may have any other polygonal shape, as may be desired.

The spring washer is provided with a downwardly extending unbroken or uninterrpted flange 28 on the outer edge of the ring portion 26. This flange functions to reinforce the washer. The fillets or junctions 29 between the base portion 27a of each of the leaves and the ring portion 26, at both edges of the base portion are rounded and in the illustrated embodiment constitute portions of circles. I have found that such fillets effectively prevent cracking or rupture of the metal at the junctions of the bases of the leaves with the flat ring portion.

The spring washer is so constructed that if the shank portion 14 turns in the washer at all, the corners of the shank will make contact with the base portions 27a of the leaves at their inner edges rather than with their free ends 27c, as shown in Figs. 2 and 4. With such a construction, the free ends of leaves remain out of contact with the ring portion 26, and therefore are free to flex or yield under pressure.

When the spring washer is positioned in the grinder assembly as shown, the center portions 27b of the leaves are in contact with the flat top surface of the knife hub, and constitute and define one pressure surface of the washer, and the base portions 27a and the free end portions 27c of the leaves are in contact with the flat under surface of the shoulder 13 of the shank and constitute the other pressure surface. The hand wheel 24 is tightened such that the plate 19 and knife 17 have been moved upwardly with the center portions 27b of the leaves forced against the inherent spring pressure of the leaves upwardly toward the plane of the ring portion 26, the leaves thus being forced from their bowed condition as shown in Fig. 5 to a less bowed condition. When positioned in the assembly, the spring washer causes the knife member and the plate member to bear against each other with the desired amount of spring pressure.

It will be understood that a source of power is connected with the feed screw causing rotation thereof when the grinder is in operation. The food or other material being ground travels down in the housing 11 in the threads of the screw. By the rotation of the screw, the material is cut by the knife and forced through the perforations of the plate member. The spring washer 16 is positioned in the grinder assembly with the flange 28 extending toward the plate 19 and substantially no material being ground thus collects on the spring washer or gets into the recess of the screw just above the washer.

The spring washer comprising the flat ring portion, the several leaves and the flange are formed or stamped out of a single piece of suitable spring metal. It has been found that chrome-vanadium spring steel is a satisfactory spring metal. The thickness of the spring metal will depend on the amount of pressure that is to be placed on the spring washer. A spring washer of a thickness of .072 inch has been found to be satisfactory on large machines operating with a motor of from 25 to 40 horsepower. Spring metal of a thickness of .042 inch has been found to be satisfactory for relatively small machines operating with a motor of ½ to ¾ horsepower.

The best results from a grinder of this type are obtained when the knife and plate members bear against each other with a pressure which is not too great or too little. With too great a pressure, the contacting surfaces of the plate and knife wear quickly and both must be reground after only a short period of use. The knife and plate with such pressure holding them in contact become heated and burn and sear the food material passing through the grinder. With such a condition the wear on the other parts of the grinder is also excessive, and an unduly large amount of power is needed to drive the grinder. When the pressure between the knife and plate members is too little, the knife member does not properly cut the food material. With the spring washer in the grinder assembly, the hand wheel may be easily adjusted to bring the knife and plate members together with a correct pressure, since the yieldable spring washer allows the hand wheel to be turned between much wider limits at which the pressure between the knife and plate members is substantially correct than would be the case with no washer in the assembly.

My improved spring washer is simple in construction and is economical to manufacture. It does not require any cavity in any member of the grinder in which food material might collect, and the spring washer itself collects none of the material being ground. An unsanitary condition arising from the ground material collecting in the grinder, therefore, does not arise. My spring washer may be used with any standard food grinder of the type described without any reconstruction of the grinder parts.

I do not intend to limit the invention to the details of construction shown and described except only in so far as certain of the appended claims are specifically so limited, as it will be obvious that modifications may be made without departing from the principles of the invention.

I claim:

1. In a food chopper of the type described having an assembly comprising a perforated discharge plate member, a knife member in contact relation with one face of the plate member, one of said members being non-rotatable, a driven shouldered shaft connected with the other of said members for turning it relative to the non-rotatable member, and means for locking the parts of said assembly together to maintain said plate and knife members in operative relation; a cup-shaped spring washer in the form of a ring having an unbroken margin and a plurality of spring leaves struck from the washer with the leaves extending generally as chords and with their mid portions deflected out of the plane of the ring, said washer being adapted to be positioned in said assembly between the shoulder on the shaft and said locking means with the deflected portions of said leaves in contact with said knife member and forming the only pressure contact between said washer and said knife member for holding the knife member and perforated plate member in working contact under spring pressure.

2. In a food chopper of the type described having an assembly comprising a perforated discharge plate member, a knife member in contact relation with one face of the plate member, one of said members being non-rotatable, a driven shouldered shaft connected with the other of said members for turning it relative to the non-rotatable member, and means for locking the parts of said assembly together to maintain said plate and knife members in operative relation; spring washer means comprising in combination a ring portion having an uninterrupted periphery and a plurality of spring leaves, each of said leaves having a part attached to said ring portion and another part detached therefrom, said spring washer means being adapted to be positioned in said assembly between the shoulder on the shaft and said locking means for holding the knife member and the perforated plate member in working contact under spring pressure, the mid portions of said leaves being deflected out of the plane of the ring and in contact with the knife member hub and constituting the sole pressure engagement of the washer and the knife member, the peripheral margin of said washer being out of contact with said knife.

3. In a food chopper of the type described having an assembly comprising a non-rotatable perforated discharge plate member, a knife member in contact relation with one face of the plate member, a driven shouldered shaft having a portion polygonal in cross section extending through a similar polygonnally-shaped opening in said knife member for turning it relative to said plate member, and means for locking the parts of said assembly together to maintain said plate and knife members in operative relation; spring washer means comprising in combination a ring portion and a plurality of spring leaves, each of said leaves having a part attached to said ring portion and another part detached therefrom, said leaves being disposed inwardly of said ring portion with their inner edges defining a polygonal opening through said spring washer means of a size and shape to receive the polygonal portion of said shaft whereby said spring washer means is adapted to be positioned on said shaft between the shoulder thereon and said knife member for holding the knife member and said perforated plate member in working contact under spring pressure, at least portions of the detached parts of the respective leaves being substantially out of a plane common to those parts of the leaves attached to said ring portion when said spring washer means is free of said assembly and being forced toward said plane when the spring washer means is in operative position in said assembly.

4. In a food chopper of the type described having an assembly comprising a non-rotatable perforated discharge plate member, a knife member in contact relation with one face of the plate member, a driven shouldered shaft having a portion polygonal in cross section extending through a similar polygonally-shaped opening in said knife member for turning it relative to said plate member, and means for locking the parts of said assembly together to maintain said plate and knife members in operative relation; spring washer means comprising in combination a flat ring portion and a plurality of spring leaves, each of said leaves being attached at an end thereof to said ring portion, said leaves being disposed inwardly of said ring portion with their inner edges defining a polygonal opening through said spring washer means of a size and shape to receive the polygonal portion of said shaft whereby said washer means is adapted to be positioned on said shaft between the shoulder thereon and said knife member for holding the knife member and said perforated plate member in working contact under spring pressure, each of said leaves having its ends disposed in the plane of said ring portion and having a central part thereof disposed substantially out of the plane of the ring portion when said spring washer means is free of said assembly, said central part of each of said leaves being forced toward said plane when said spring washer means is in operative position in said assembly.

5. In a food chopper of the type described having an assembly comprising a non-rotatable perforated discharge plate member, a knife member in contact relation with one face of the plate member, a driven shouldered shaft having a portion polygonal in cross section extending through a similar polygonally-shaped opening in said knife member for turning it relative to said plate member, and means for locking the parts of said assembly together to maintain said plate and knife members in operative relation; spring washer means comprising in combination a flat ring portion, a plurality of spring leaves, and a reinforcing flange on the outer edge of said ring portion all formed from the same piece of metal and integrally connected, said leaves being disposed inwardly of said ring portion with their inner edges defining a polygonal opening through said spring washer means of a size and shape to receive the polygonal portion of said shaft whereby said spring washer means is adapted to be positioned on said shaft between the shoulder thereon and said knife member for holding the knife member and said perforated plate member in working contact under spring pressure, said ring portion having curved fillets adjacent the respective ends of each of said leaves, each of said leaves having its ends disposed in the plane of said ring portion and having a central part thereof disposed substantially out of the plane of the ring portion when said spring washer means is free of said assembly, said central part of each of said leaves being forced toward said plane when said spring washer means is in operative position in said assembly.

6. In a food chopper of the type described having an assembly comprising a perforated discharge plate member, a knife member in contact relation with one face of the plate member, one of said members being non-rotatable, a driven shouldered shaft connected with the other of said members for turning it relative to the non-rotatable member, said shaft having a polygonal portion adjacent said shoulder, and means for locking the parts of said assembly together to maintain said plate and knife members in operative relation; spring washer means adapted to be positioned in said assembly between the shaft shoulder and the knife member, said washer means comprising an unbroken peripheral ring portion and a plurality of integral chordal spring leaves, said leaves being attached to said ring at similar ends and otherwise free, said leaves being so formed that their chordal margins adjacent the center of the ring define a polygonal opening adapted to receive the said polygonal shaft portion to thereby constitute the sole means for establishing driving relation between the shaft and the washer, and portions of the leaves being deflected out of the plane of the washer to be forced toward the plane of the washer when squeezing pressure is applied to opposite faces of the washer.

7. In a food chopper of the type described having an assembly comprising a perforated discharge plate member, a knife member in contact relation with one face of the plate member, one of said members being non-rotatable, a driven shouldered shaft connected with the other of said members for turning it relative to the non-rotatable member, said shaft having a polygonal portion adjacent said shoulder, and means for locking the parts of said assembly together to maintain said plate and knife members in operative relation; spring washer means adapted to be positioned in said assembly between the shaft shoulder and the knife member, said washer means comprising a ring having an unbroken peripheral portion and a plurality of integral chordal spring leaves, the margins of the leaves adjacent the periphery of the washer being curved and the margins of the leaves adjacent the center of the washer being straight to thereby define a polygonal central opening through the washer to fit the polygonal portion of the shaft, and portions of the lengths of said leaves being deflected out of the plane of the washer to be forced toward said plane when the washer is subjected to squeezing pressure, the deflected leaves constituting one pressure surface and the peripheral portion of the washer constituting the other pressure surface.

ALEXANDER F. KAPTULLER.